No. 879,049. PATENTED FEB. 11, 1908.
T. J. HIGHTOWER.
GATE.
APPLICATION FILED NOV. 26, 1907.

2 SHEETS—SHEET 1.

Witnesses
Stuart Hilder.
George M. Anderson.

Inventor
Thomas J. Hightower
By E. W. Anderson
his Attorney

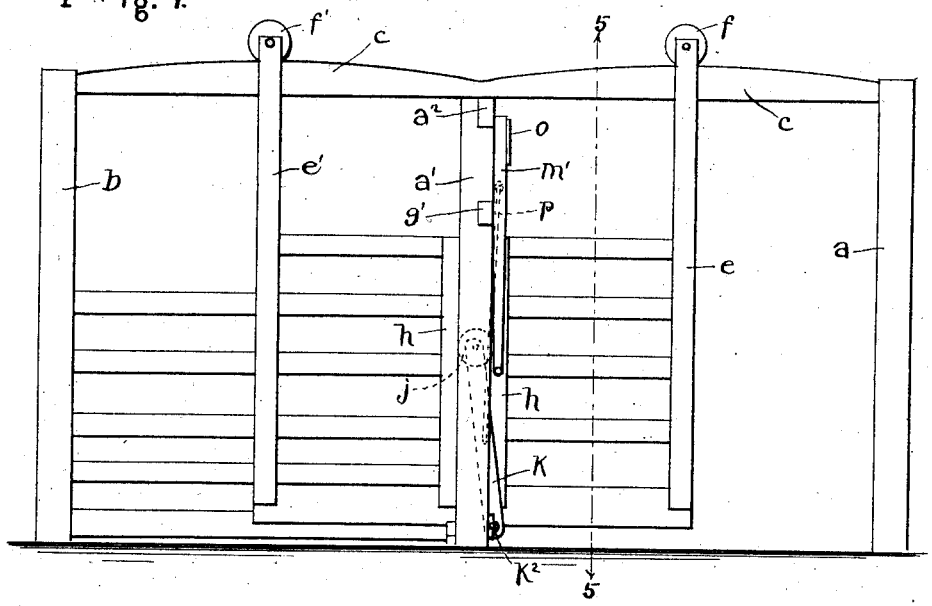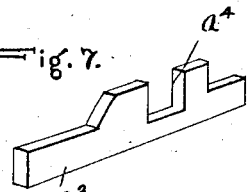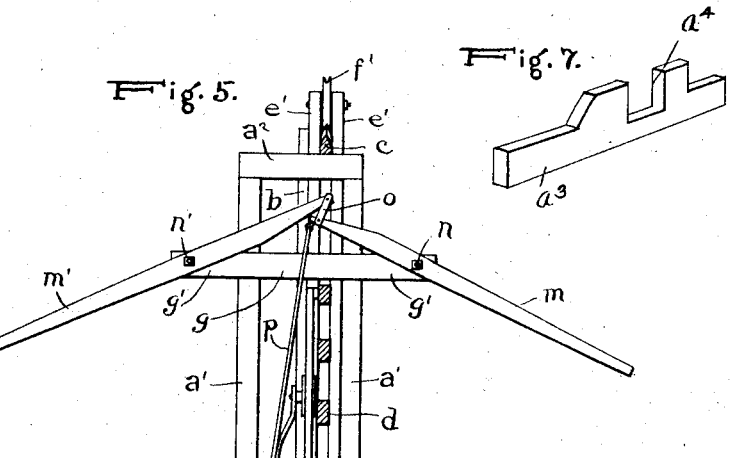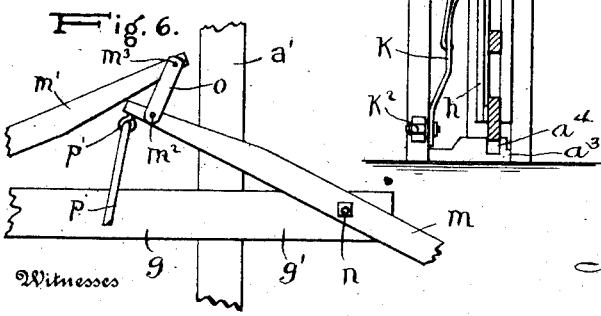

UNITED STATES PATENT OFFICE.

THOMAS J. HIGHTOWER, OF MURFREESBORO, TENNESSEE.

GATE.

No. 879,049.  Specification of Letters Patent.  Patented Feb. 11, 1908.

Application filed November 26, 1907. Serial No. 403,890.

*To all whom it may concern:*

Figure 1:
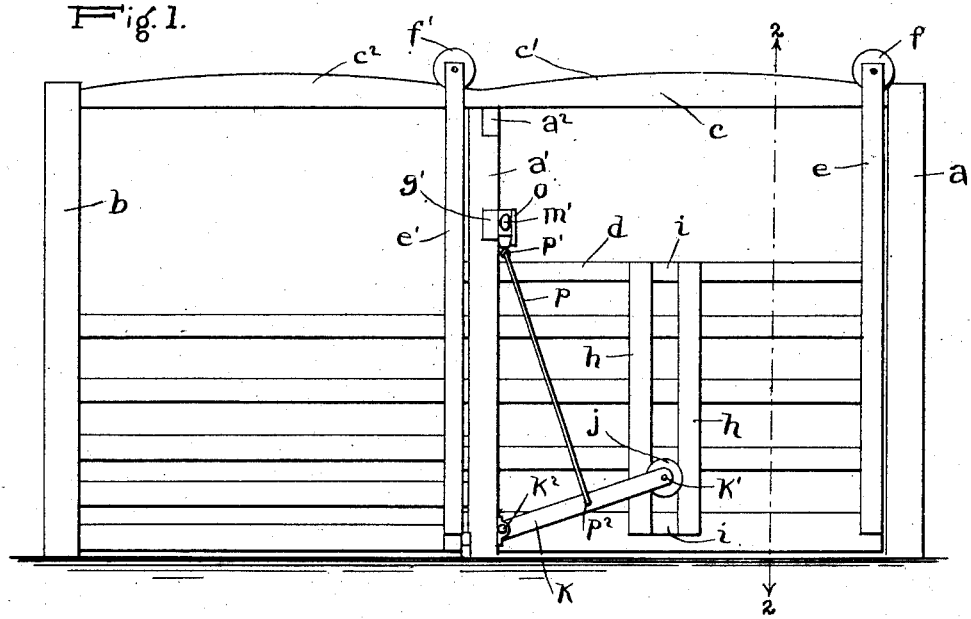
Figure 2:
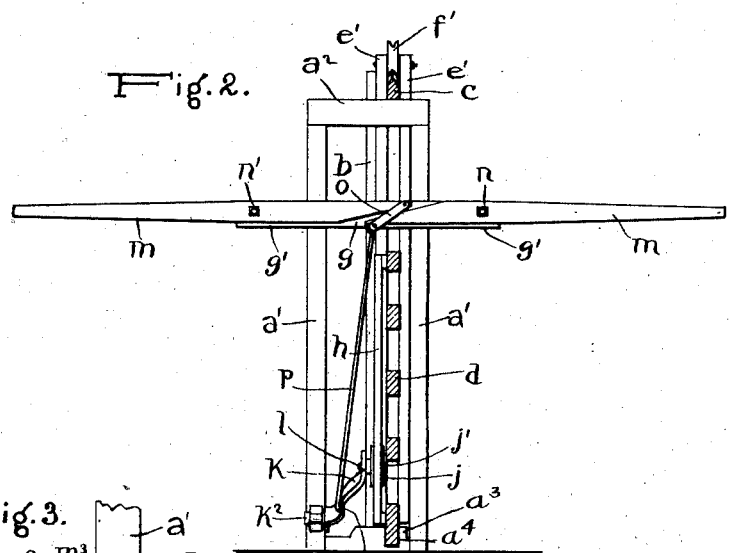
Figure 3:
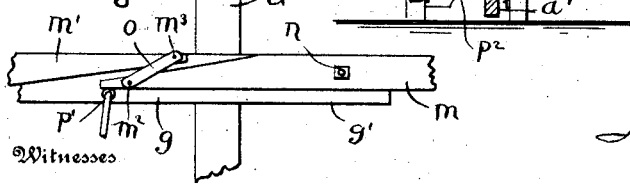

Be it known that I, THOMAS J. HIGHTOWER, a citizen of the United States, resident of Murfreesboro, in the county of Rutherford and State of Tennessee, have made a certain new and useful Invention in Gates; and I declare the following to be a full, clear, and exact description of the same, such as will enable others skilled in the art to which it appertains to make and use the invention, reference being had to the accompanying drawings, and to letters or figures of reference marked thereon, which form a part of this specification.
Figure 1 is a side view of the gate in closed position. Fig. 2 is a section on the line 2—2 Fig. 1. Fig. 3 is a fragmentary detail view showing the inner end portion of the operating levers in the positions shown in Fig. 2.
Fig. 4 is a side view of the gate in the intermediate or middle position with the carrying rollers at the tops of the track arches. Fig. 5 is a section on the line 5—5 Fig. 4. Fig. 6 is a fragmentary detail view showing the inner end portions of the operating levers in the positions shown in Fig. 5. Fig. 7 is a detail view of the notched bar connecting the lower ends of the sections of the middle post.

The invention relates to gates of lever operated character, having for its object the provision of such a gate which can be conveniently and economically constructed from any ordinary farm gate, and which is adapted for easy operation from a buggy or wagon or by an equestrian.

The invention consists in the novel construction and combinations of parts, as hereinafter set forth.

In the accompanying drawings, illustrating the invention, the letters $a$, $a'$, designate the gate posts, which rise some distance above the gate proper, and $b$, is a post at one side, in line with the gate posts, of similar height and separated from the gate post $a'$, by a distance similar to that separating the two posts $a$, $a'$.

$c$, is a horizontal track connecting the posts $a$, $a'$, and $b$, and having a double convex curvature at the top, the convex section $c'$, lying between the gate posts $a$, $a'$, and the convex section $c^2$, lying between the posts $a'$, and $b$.

$d$, is the gate, which is provided at each end portion thereof with uprights $e$, $e'$, carrying rollers $f$, $f'$, at the top, such rollers being shown as of grooved character and engaging the angular or edged top of the trackway $c$.

The middle post $a'$, is of double character, having a cross bar connection $a^2$, at the top, to which the trackway is secured at its central portion, this middle post having a transverse bar connection $g$, below the bar $a^2$, and above the gate. The transverse bar $g$, has extensions $g'$, at each side beyond the sections of the post $a'$.

$h$, $h$, represent parallel vertical bars secured to the central portion of the gate by means of end pieces $i$, $i$, and forming a closed track for the grooved roller $j$, which engages the angular or edged inner portions of the bars $h$, $h$. This roller is provided with a lever arm $k$, of flattened character, which is provided with a perforation $k'$, at one end fitting over the horizontal journal pin $j'$, of such roller and secured thereupon by a nut $l$.
This lever arm $k$, is bent outward toward the section of the post $a'$, at the same side and is pivoted or fulcrumed thereto at its opposite end at $k^2$.

$m$, and $m'$, represent operating levers, which are intermediately fulcrumed to the extensions $g'$, of the transverse bar $g$, at $n$, and $n'$, the inner end portions of such levers being connected by parallel links $o$, $o'$, which are pivoted to such levers at $m^2$, $m^3$. The lever $m$, has, pivoted to its inner end as shown at $p'$, the connecting bar $p$, which at its opposite end is pivoted to the lever arm $k$, intermediately thereof, at $p^2$. The pivot $p'$, is located at the extremity of the lever $p$, beyond the link pivot $m^2$.

The gate works between the two sections of the double post $a'$, which lie at each side thereof. Upon depression of either lever $m$, or $m'$, the connecting bar $p$ is moved upward to cause an upward movement of lever arm $k$, and of the roller $j$, at the end thereof, whereby through pressure of the roller against one of the bars $h$, of its trackway the gate is moved therewith and at the same time is slightly lifted, owing to the convex character of the track from which it is suspended. By the time the depression of the lever is completed the gate will have reached the top of the convex rise of the track, and by making the movement of the lever of rather sudden character the gate will pass such rise and move on the down grade to open position without the necessity for further operation of the lever.

The parallel links $o$, $o'$, connecting the inner ends of the operating levers form means whereby the operation of either lever $m$, or $m'$, will effect the desired movement of the gate. The operation of the parts for closing the gate will be readily understood, being practically the same as described for opening.

The sections of the post $a'$, are connected at the bottom by means of a transverse bar $a^3$, having a notch $a^4$, in its upper face in which rides and is confined the bottom of the gate.

Having thus described my invention, what I claim and desire to secure by Letters Patent is:—

In a lever operated gate, three posts in line, the middle post being of double character composed of two upright sections having a transverse top bar connection, a horizontal track supported by said posts and composed of two alined sections each having a low upward arch, a gate having end uprights carrying grooved rollers engaging said track, said middle post having an intermediate transverse bar connection located above the gate and provided with end extensions beyond the post sections, operating levers arranged and having movement in the same plane and having an intermediate fulcrum connection with said end extensions, said levers extending at right angles to the gate and having a link pivotally connected thereto at their inner end portions, one of said levers having an end extension beyond the pivotal connection thereof with such link, said gate having a trackway including two parallel vertical separated bars, a grooved roller engaging said trackway, a lever arm having pivotal connection at one end thereof with the journal pin of said roller, and at its opposite end having a fulcrum connection with one of the upright sections of the middle post, and a connecting rod having at one end thereof a pivotal connection with said lever arm intermediately thereof and at its opposite end having a pivotal connection with said end extension of one of the operating levers.

In testimony whereof I affix my signature, in presence of two witnesses.

THOMAS J. HIGHTOWER.

Witnesses:
J. ALF RANSOM,
LENA ANDERSON.